Figure 1:
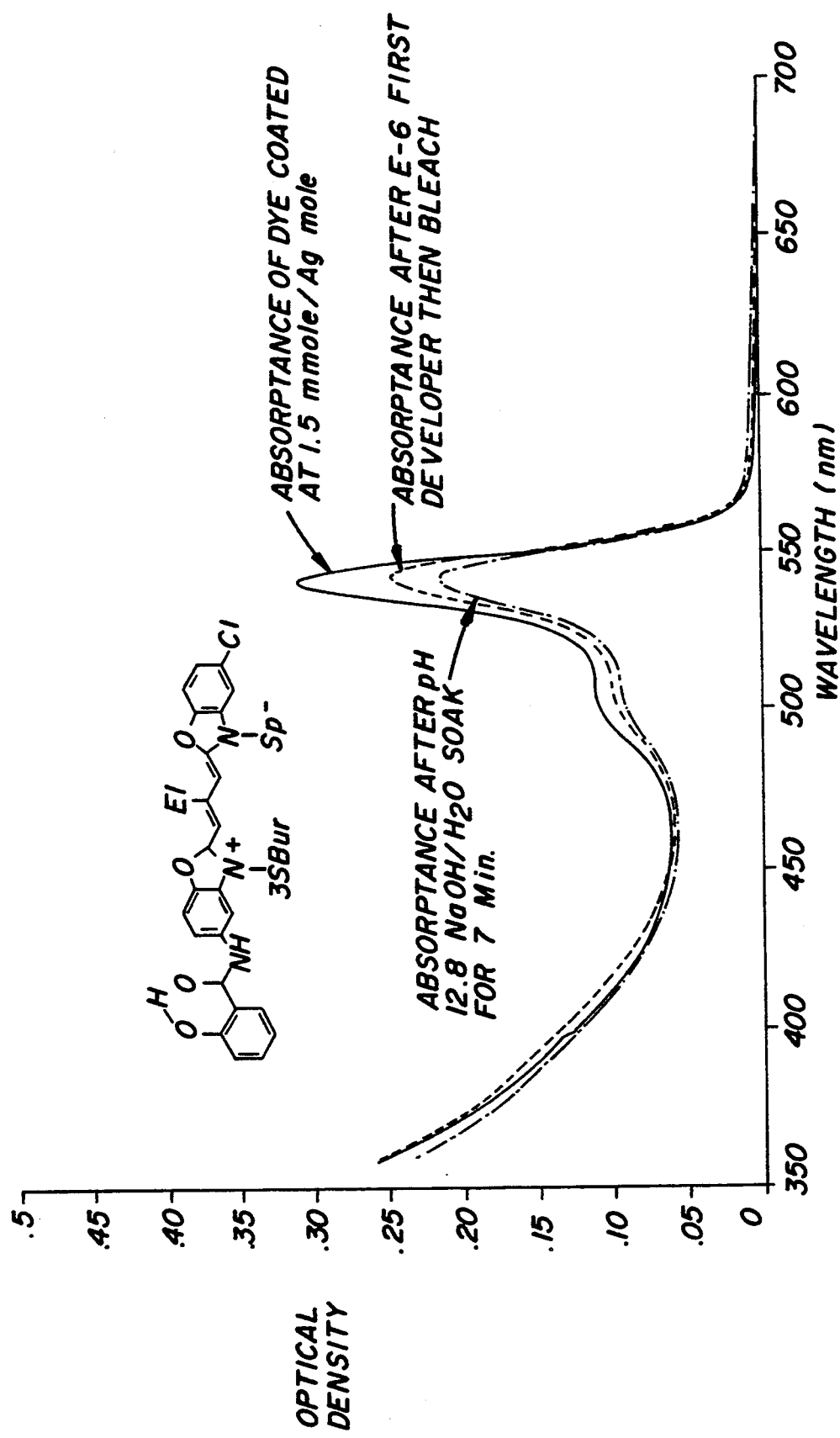

United States Patent [19]

Parton

[11] Patent Number: 5,354,651

[45] Date of Patent: Oct. 11, 1994

[54] HYDROXYARYLACYL DYE COMPOUNDS AND SILVER HALIDE PHOTOGRAPHIC ELEMENTS CONTAINING SUCH DYES

[75] Inventor: Richard L. Parton, Webster, N.Y.

[73] Assignee: Eastman Kodak Company, Rochester, N.Y.

[21] Appl. No.: 978,569

[22] Filed: Nov. 19, 1992

[51] Int. Cl.$^5$ .................. G03C 1/14; G03C 1/16; G03C 1/18; G03C 1/20

[52] U.S. Cl. .................. 430/583; 430/567; 430/584; 430/588

[58] Field of Search .............. 430/567, 582, 583, 584, 430/586, 587, 588

[56] References Cited

U.S. PATENT DOCUMENTS

| | | | |
|---|---|---|---|
| 3,397,060 | 8/1968 | Schwan et al. | 96/104 |
| 3,764,340 | 10/1973 | Skiba et al. | 96/124 |
| 3,770,449 | 11/1973 | Shiba et al. | 96/124 |
| 3,832,189 | 8/1974 | Shiba et al. | 430/574 |
| 3,918,979 | 11/1975 | Sato et al. | 96/137 |
| 4,032,349 | 6/1977 | Sakanoue et al. | 96/77 |
| 4,800,154 | 1/1989 | Okazaki et al. | 430/570 |

FOREIGN PATENT DOCUMENTS

| | | |
|---|---|---|
| 0447138 | 3/1991 | European Pat. Off. . |
| 0451816 | 4/1991 | European Pat. Off. . |
| 2108527 | 5/1972 | France . |
| 57-47493 | 3/1982 | Japan . |
| 61-252545 | 4/1985 | Japan . |

OTHER PUBLICATIONS

Chemical Abstract CA97(7):51808e relating to JP57-47493 and Registry identification of 82459-11-8. Derwent Publications Ltd.; J6 1252-545-A; Konishiroku Photo KK; Green-sensitive silver halide photographic material-contg. magenta coupler and two kinds of sensitised dye.

Primary Examiner—Janet C. Baxter
Attorney, Agent, or Firm—Gordon M. Stewart

[57] ABSTRACT

Spectral sensitizing dyes, and silver halide photographic elements incorporating them, which dyes have the formula:

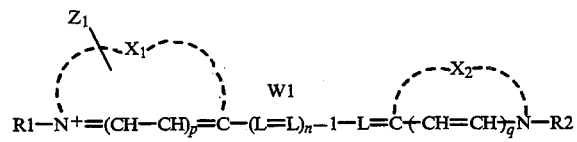

wherein:
X1 and X2 each independently represent the atoms necessary to complete a 5- or 6-membered heterocyclic nucleus, wherein X1 may be further substituted and X2 may be substituted or unsubstituted;
n is a positive integer from 1 to 4;
p and q each independently represents 0 or 1,
each L independently represents a substituted or unsubstituted methine group,
R1 and R2 each independently represents substituted or unsubstituted aryl or substituted or unsubstituted aliphatic groups;
Z1 represents a substituent containing an hydroxyarylacyl group (preferably an α-hydroxyarylacyl group), an aromatic ring of which may be appended or fused to X1; and
W1 is a counterion as needed to balance the charge of the molecule.

26 Claims, 2 Drawing Sheets

HYDROXYARYLACYL DYE COMPOUNDS AND SILVER HALIDE PHOTOGRAPHIC ELEMENTS CONTAINING SUCH DYES

FIELD OF THE INVENTION

This invention relates to dyes and silver halide photographic elements containing such dyes as sensitizing dyes.

BACKGROUND OF THE INVENTION

Silver halide photography usually involves the exposure of silver halide photographic element with light in order to form a latent image that is developed during photographic processing to form a visible image. Silver halide is intrinsically sensitive only to light in the blue region of the spectrum. In order to sensitize the silver halide to other than the blue region, sensitizing dyes are used in the silver halide emulsion. Sensitizing dyes are chromophoric compounds (usually cyanine dye compounds). Their usual function is to adsorb to the silver halide and to absorb light (usually other than blue light) and transfer that energy via an electron to the silver halide grain thus, rendering the silver halide sensitive to radiation of a wavelength other than the blue intrinsic sensitivity. However, sensitizing dyes can also be used to augment the sensitivity of silver halide in the blue region of the spectrum.

Generally a sensitizing dye should wash out of the film or paper during processing. Any retained dye contributes to Dmin and this is often referred to as sensitizing dye stain. Dye stain, which adversely affects the image recorded in the photographic element, has been a source of concern for many years. The problem of retained sensitizing dye stain has been aggravated by the advent of new emulsions, such as tabular grains, which have more surface area and use higher dye levels and accordingly tend to give higher levels of dye stain. Additionally, the use of high chloride emulsions makes preferable the use of sensitizing dyes having enhanced adsorption to silver halide since sensitizing dyes tend to be inherently less well adsorbed to silver chloride emulsions. This can also lead to higher levels of dye stain. Such high chloride emulsions are also often subjected to rapid processing, which can further aggravate dye stain problems.

In order to reduce dye stain, stain-reducing agents, such as bis-triazine stilbene compounds, also known as optical brighteners, have been used to reduce dye stain. These compounds, however, are expensive and can be difficult to incorporate in the hydrophilic layers of photographic elements. Another method for reducing dye stain in some cases, is to incorporate certain substituents into the dye molecule to reduce dye stain. For example, dyes containing N,N'-2-hydroxy-3-sulfopropyl nitrogen substituents (J. Gotze, et al., U.S. Pat. No. 3,424,586) are generally less retained than the corresponding dyes with 3-sulfopropyl groups. Other stain-reducing nitrogen substituents have also been disclosed such as the 2-sulfoethylcarbamoylmethyl groups disclosed in U.S. Pat. No. 5,091,298 to Parton et al.

Although the foregoing dye structure modifications can be effective at reducing dye stain they have not eliminated the problem. New substituents are always desirable which will result in dyes with low dye stain. In addition, there is an important class of green sensitizers for which it is not possible to use these types of stain-reducing nitrogen substituents. In particular, benzoxazole dyes (an example is given in Formula A below) are commonly used to afford green sensitization in many photographic products such as color negative and reversal films, and color paper.

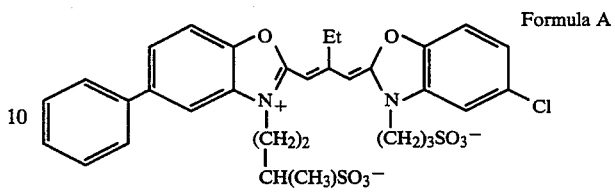

Formula A

In many instances, benzoxazole dyes also produce undesirable post-process stain. However, it has not been possible to incorporate the aforementioned stain-reducing nitrogen substituents on these dyes because the benzoxazole nucleus is too reactive. For instance, attempts to place a 2-hydroxy-3-sulfopropyl substituent, a 2-sulfoethylcarbamoylmethyl or similar group on the benzoxazole nucleus result in ring-opening of the benzoxazole. Thus, alternative stain reducing substituents are especially needed for dyes containing the benzoxazole nucleus.

It is desirable then to provide new dye compounds useful as sensitizing dyes for silver halide photographic elements, which dyes have relatively low dye stain. It is further desirable to provide, in particular, new benzoxazole sensitizers which exhibit relatively low dye stain.

SUMMARY OF THE INVENTION

The present invention provides sensitizing dyes, and silver halide photographic element containing them, which dyes have the structure:

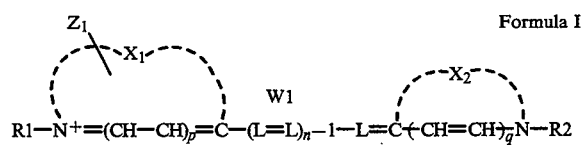

Formula I wherein:
X1 and X2 each independently represent the atoms necessary to complete a 5- or 6-membered heterocyclic nucleus, wherein X1 may be further substituted and X2 may be substituted or unsubstituted;
n is a positive integer from 1 to 4;
p and q each independently represents 0 or 1;
each L independently represents a substituted or unsubstituted methine group;
R1 and R2 each independently represents substituted or unsubstituted aryl or substituted or unsubstituted aliphatic groups;
Z1 represents a substituent containing an hydroxyarylacyl group an aromatic ring of which may be appended or fused to X1; and
W1 is a counterion as needed to balance the charge of the molecule.

DRAWINGS

Figure 2:
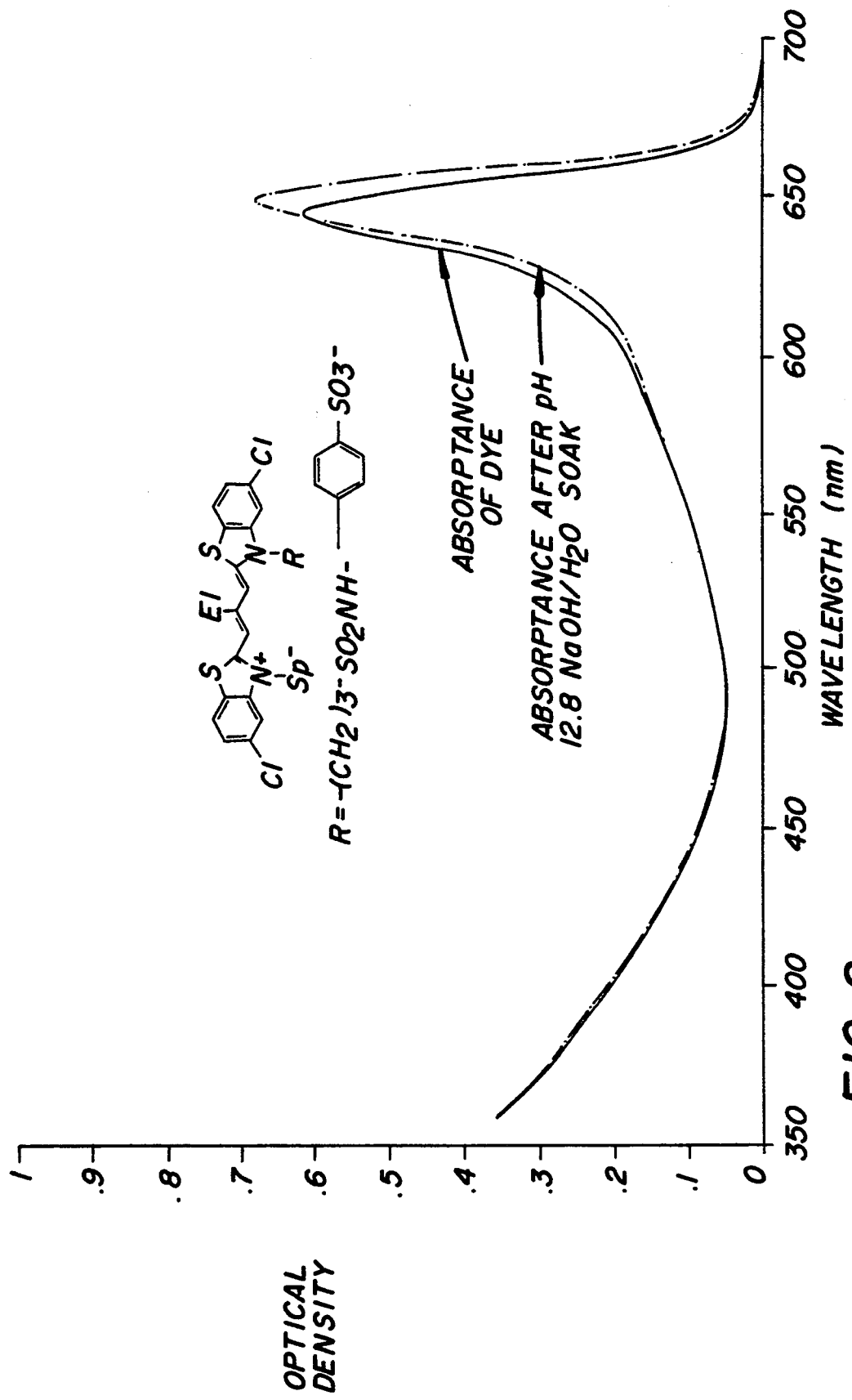

Embodiments of the invention will be described with reference to the drawings in which:

FIG. 1 is a plot of optical density versus wavelength of a dye of the present invention adsorbed on an unexposed emulsion, showing the effect of a high pH soak; and FIG. 2 is a plot similar to that of FIG. 1 except that the dye is a comparison dye (that is, a dye which is not of the present invention).

EMBODIMENTS OF THE INVENTION

Preferably, the hydroxyarylacyl group is an α-hydroxyarylacyl group. An α-hydroxyarylacyl group in dyes of the present invention, is a group having the structure:

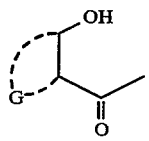

wherein G is an aromatic ring. An aromatic ring is a ring of the type described as aromatic in J. March, *Advanced Organic Chemistry*, Chapter 2, (1985, publisher John Wiley & Sons, New York, N.Y.). The aromatic ring can be a hydrocarbon or heterocyclic. Examples of aromatic rings include phenyl, furan, pyrrole and thiophene.

Dyes of the structure of the present invention would preferably not have a net charge more negative than $-1$ at a pH of 4 to 7 in water (that is, they preferably would not have a negative charge of $-2$, $-3$, or the like in that pH range). In one embodiment of the invention, the aromatic ring of $Z_1$ is appended to $X_1$ through a chain of atoms which is no more than 4, 3, 2 or 1 atoms (including the acyl carbon atom). However, any such chain and any substituents on $Z_1$ should preferably maintain the relatively planar shape of the $Z_1$-$X_1$ group. The α-hydroxyarylacyl group may specifically be an α-hydroxyarylketone, an α-hydroxyarylcarboxylic acid, an α-hydroxyarylester, an α-hydroxyarylaldehyde and an α-hydroxyarylamide. Examples of the foregoing include 2-hydroxybenzamido, 2,6-dihydroxybenzamido, 2-hydroxybenzoyl, 2-hydroxybenzoate, and the like. Additional examples are shown below:

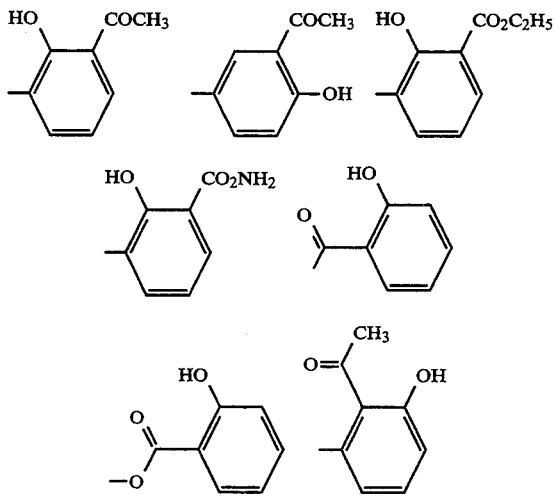

In one type of dye of the present invention, the α-hydroxyarylacyl is an α-hydroxyphenylamide the N of which, when the dye has a benzo-condensed nucleus, is directly bonded to the benzene ring of such nucleus. Furthermore, the aromatic ring of $Z_1$ may be appended or fused to $X_1$ or $X_2$, or may be indirectly bonded thereto for example, through a substituted or unsubstituted group although any linking group should preferably be flat in structure, for example, an alkylene group. In a preferred embodiment, at least one and preferably both of $R_1$ and $R_2$ are substituted with acid salt substituents (e.g. sulfo), as this tends to even further reduce post-process dye stain.

Preferably, the sensitizing dyes of the present invention have the structure of formula II below:

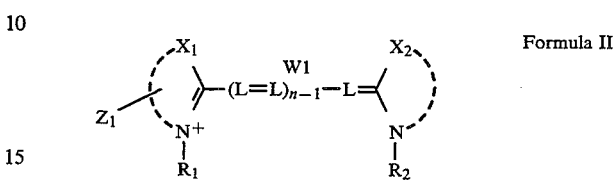

Formula II wherein:
X1 and X2 independently represent the atoms necessary to complete a benzothiazole nucleus, benzoxazole nucleus, benzoselenazole nucleus, benzotellurazole nucleus, quinoline nucleus, or benzimidazole nucleus in which X1 may be further substituted and X2 may be subsituted or unsubstituted with, preferably, non-aromatic substituents;
n, L, R1, R2, Z1 and W2 are as defined above in connection with Formula I.

A particularly useful set of dyes of the present invention is of the type of Formula III below, and more particularly of the type of Formula IV below:

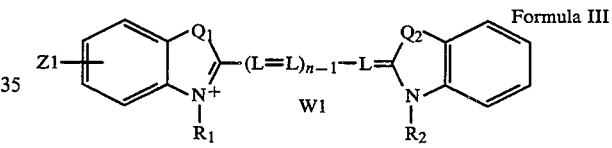

Formula III

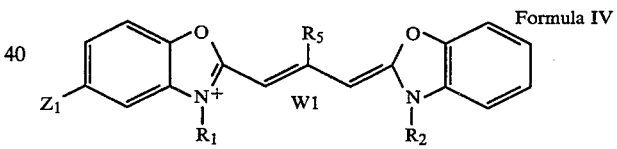

Formula IV

In the above formulae, Q1 and Q2 independently represent O, N or S, or could represent Se or Te. Each nucleus of the dyes of the above formulae I to IV may be optionally substituted with, for example, halogen (e.g., chloro, fluoro, bromo), hydroxy, alkoxy (e.g. methoxy, ethoxy), substituted or unsubstituted alkyl (e.g. methyl, trifluoromethyl), substituted and unsubstituted aryl (e.g. phenyl, 5-chlorophenyl), cyano, alkylcarbamoyl, alkylcarboxamido, and the like and others known in the art. Preferably, any such substituents other than Z1, are non-aromatic. R5 is H. Alternatively, R5 or any optional substituents on the methine groups L, may be alkyl (preferably a lower alkyl, for example, methyl, ethyl, and the like) aryl (for example, phenyl), thioalkyl (for example, methylthio or ethylthio), hydroxy or alkenyl. By "lower alkyl" is meant an alkyl group of from 1 to 6 carbon atoms. Additionally, substituents on the methine groups may form bridged linkages. Preferably, R5 or any other methine group substituent is non-aromatic. The counterion, W1, which is present as necessary to balance the charge of the dye molecule may include known counterions such as sodium, potassium, triethylammonium, and the like.

Any of the classes of sensitizing dyes of the present invention, and photographic elements containing them, may optionally specifically exclude each or all of the following dye groups:

1) the furan or pyrrole substituted dyes of U.S. Patent Application "Furan or Pyrrole Substituted Dye Compounds and Silver Halide Photographic Elements Containing Such Dyes", Ser. No. 07/978,568, by Parton et al. filed the same day as this application; or 2) the amide substituted dyes of U.S. Patent Application "Amide Substituted Dye Compounds and Silver Halide Photographic Elements Containing Such Dyes:, Ser. No. 07/978,589, by Parton et al. filed the same day as this application.

The above applications are incorporated in the present application by reference.

Examples of dyes of the present invention include dyes I-1 to I-7 shown below as well as the dyes I-9 and I-10 in Table 1 listed later:

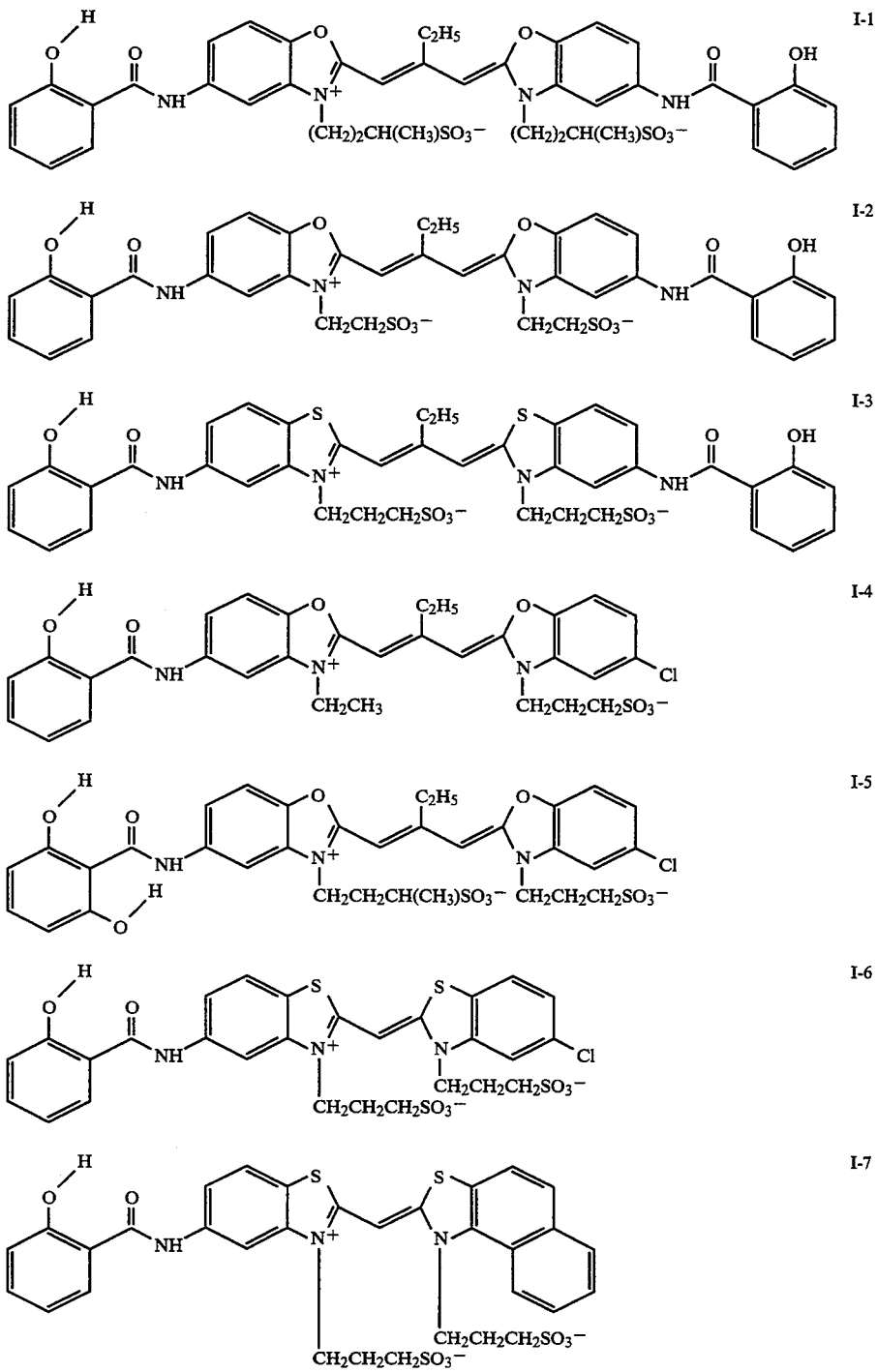

The photographic element which contains dyes of the present invention may particularly be those of a type which have a water-immiscible dispersion into which the sensitizing dye of the present invention can at least partially migrate. For example, the photographic element may be a color photographic element having a layer (usually, but not necessarily the same layer which contains silver halide and the sensitizing dye) which contains a color coupler dispersion into which the dye can at least partially migrate.

Precursors of sensitizing dyes described above, can be made by techniques that are well-known in the art. For example, reaction of a 5-amino base with an aromatic (B) acid chloride affords an aromatic amide-substituted base.

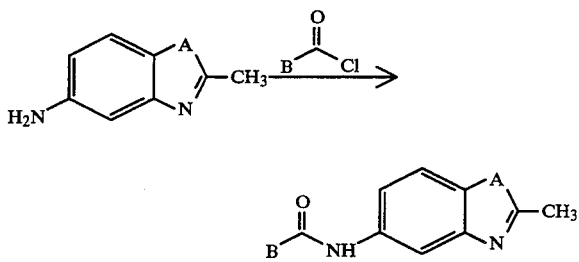

Nitration of an aromatic (Ar) substituted base followed by reduction affords an amine. Reaction with an acid chloride affords an amide-substituted aromatic base.

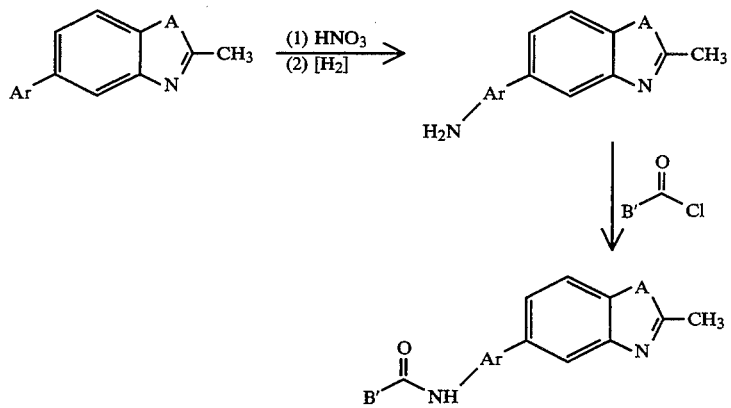

Dyes of formula I can be prepared from the above dye precursers according to techniques that are well-known in the art, such as described in Hamer, *Cyanine Dyes and Related Compounds,* 1964 (publisher John Wiley & Sons, New York, N.Y.) and James, *The Theory of the Photographic Process* 4th edition, 1977 (Eastman Kodak Company, Rochester, N.Y.). The amount of sensitizing dye that is useful in the invention is preferably in the range of 0.1 to 4.0 millimoles per mole of silver halide and more preferably from 0.2 to 2.2 millimoles per mole of silver halide. Optimum dye concentrations can be determined by methods known in the art.

The silver halide used in the photographic elements of the present invention may be silver bromoiodide, silver bromide, silver chloride, silver chlorobromide, and the like. The silver halide used in the photographic elements of the present invention preferably contains at least 90% silver chloride or more (for example, at least 95%, 98%, 99% or 100% silver chloride). In particular, the possibility is also contemplated that the silver chloride could be treated with a bromide solution to increase its sensitivity, although the bulk concentration of bromide in the resulting emulsion will typically be no more than about 2 to 2.5% and preferably between about 0.6 to 1.2% (the remainder being silver chloride). The foregoing % figures are mole %.

The photographic elements of the present invention may particularly use the sensitizing dye with tabular grain emulsions. In particular, they may be used with grains of the type disclosed in U.S. Pat. Nos. 4,063,951 and 4,386,156. Tabular silver halide grains are grains having two substantially parallel crystal faces that are larger than any other surface on the grain. Tabular grain emulsions are those in which greater than 50 percent of the total projected area of the emulsion grains are accounted for by tabular grains having a thickness of less than 0.3 μm (0.5 μm for blue sensitive emulsion) and an average tabularity (T) of greater than 25 (preferably greater than 100), where the term "tabularity" is employed in its art recognized usage as $$T = ECD/t^2$$

where
ECD is the average equivalent circular diameter of the tabular grains in μm and
t is the average thickness in μm of the tabular grains.
The grain size of the silver halide may have any distribution known to be useful in photographic compositions, and may be ether polydipersed or monodispersed.

The silver halide grains to be used in the invention may be prepared according to methods known in the art, such as those described in *Research Disclosure,* (Kenneth Mason Publications Ltd, Emsworth, England) Item 308119, December, 1989 (hereinafter referred to as *Research Disclosure I*) and James, *The Theory of the Photographic Process.* These include methods such as ammoniacal emulsion making, neutral or acid emulsion making, and others known in the art. These methods generally involve mixing a water soluble silver salt with a water soluble halide salt in the presence of a protective colloid, and controlling the temperature, pAg, pH values, etc, at suitable values during formation of the silver halide by precipitation.

The silver halide to be used in the invention may be advantageously subjected to chemical sensitization with compounds such as gold sensitizers (e.g., aurous sulfide) and others known in the art. Compounds and techniques useful for chemical sensitization of silver halide are known in the art and described in *Research Disclosure I* and the references cited therein.

The photographic elements of the present invention, as is typical, provide the silver halide in the form of an emulsion. Photographic emulsions generally include a vehicle for coating the emulsion as a layer of a photographic element. Useful vehicles include both naturally occurring substances such as proteins, protein derivatives, cellulose derivatives (e.g., cellulose esters), gelatin (e.g., alkali-treated gelatin such as cattle bone or hide gelatin, or acid treated gelatin such as pigskin gelatin), gelatin derivatives (e.g., acetylated gelatin, phthalated gelatin, and the like), and others as described in *Research Disclosure I*. Also useful as vehicles or vehicle extenders are hydrophilic water-permeable colloids. These include synthetic polymeric peptizers, carriers, and/or binders such as poly(vinyl alcohol), poly(vinyl lactams), acrylamide polymers, polyvinyl acetals, polymers of alkyl and sulfoalkyl acrylates and methacrylates, hydrolyzed polyvinyl acetates, polyamides, polyvinyl pyridine, methacrylamide copolymers, and the like, as described in *Research Disclosure I*. The vehicle can be present in the emulsion in any amount useful in photographic emulsions. The emulsion can also include any of the addenda known to be useful in photographic emulsions. These include chemical sensitizers, such as active gelatin, sulfur, selenium, tellurium, gold, platinum, palladium, iridium, osmium, rhenium, phosphorous, or combinations thereof. Chemical sensitization is generally carried out at pAg levels of from 5 to 10, pH levels of from 5 to 8, and temperatures of from 30° to 80° C., as illustrated in *Research Disclosure*, June 1975, item 13452 and U.S. Pat. No. 3,772,031.

The silver halide may be sensitized by dyes of the present invention by any method known in the art, such as described in *Research Disclosure I*. The dye may be added to an emulsion of the silver halide grains in a suitable vehicle (for example, gelatin) at any time prior to (for example, during or after chemical sensitization) or simultaneous with the coating of the emulsion on a photographic element. The dye/silver halide emulsion may be mixed with a dispersion of color image-forming coupler immediately before coating or in advance of coating (for example, 2 hours). Essentially any type of emulsion (for example, negative-working emulsions such as surface-sensitive emulsions of unfogged internal latent image-forming emulsions, direct-positive emulsions such as surface fogged emulsions, or others described in, for example, *Research Disclosure I*) may be used. The above-described sensitizing dyes can be used alone, or may be used in combination with other sensitizing dyes, e.g. to also provide the silver halide with sensitivity to wavelengths of light outside the green region or to supersensitize the silver halide.

Other addenda in the emulsion may include antifoggants, stabilizers, filter dyes, light absorbing or reflecting pigments, vehicle hardeners such as gelatin hardeners, coating aids, dye-forming couplers, and development modifiers such as development inhibitor releasing couplers, timed development inhibitor releasing couplers, ultraviolet absorbers, bleach accelerators and the like. These addenda and methods of their inclusion in emulsion and other photographic layers are well-known in the art and are disclosed in *Research Disclosure I* and the references cited therein. The emulsion may also include brighteners, such as stilbene brighteners. Such brighteners are well-known in the art and are used to counteract dye stain, although the dyes of the present invention generally have low dye stain even if no brightener is used.

The emulsion layer containing silver halide sensitized with a dye of the present invention can be coated simultaneously or sequentially with other emulsion layers, subbing layers, filter dye layers, interlayers, or overcoat layers, all of which may contain various addenda known to be included in photographic elements. These include antifoggants, oxidized developer scavengers, DIR couplers, antistatic agents, optical brighteners, light-absorbing or light-scattering pigments, and the like. The layers of the photographic element can be coated onto a support using techniques well-known in the art. These techniques include immersion or dip coating, roller coating, reverse roll coating, air knife coating, doctor blade coating, stretch-flow coating, and curtain coating, to name a few. The coated layers of the element may be chill-set or dried, or both. Drying may be accelerated by known techniques such as conduction, convection, radiation heating, or a combination thereof.

Photographic elements of the present invention can be black and white but are preferably color. A color photographic element generally contains three silver emulsion layers or sets of layers (each set of layers often consisting of emulsions of the same spectral sensitivity but different speed): a blue-sensitive layer having a yellow dye-forming color coupler associated therewith; a green-sensitive layer having a magenta dye-forming color coupler associated therewith; and a red-sensitive layer having a cyan dye-forming color coupler associated therewith. Those dye forming couplers are provided in the emulsion typically by first dissolving or dispersing them in a water immiscible, high boiling point organic solvent, the resulting mixture then being dispersed in the emulsion. Suitable solvents include those in European Patent Application 87119271.2. Dye-forming couplers are well-known in the art and are disclosed, for example, in *Research Disclosure I*.

Photographic elements comprising the composition of the invention can be processed in any of a number of well-known photographic processes utilizing any of a number of well-known processing compositions, described, for example, in *Research Disclosure I*, or in James, *The Theory of the Photographic Process* 4th, 1977. Such processing further includes rapid processing of the type described in, for example, U.S. Pat. No. 4,892,804.

The invention is described further in the following Examples.

SYNTHESIS EXAMPLE

A typical synthetic route for dyes of the present invention, is illustrated with the preparation of dye I-16 shown in Table 1 below.

Intermediate A: 5-(2-Acetoxybenzamido)-2-methylbenzoxazole: 5-Amino-2-methylbenzoxazole (18.6 g, 0.126 mol) and 2,6-lutidine (14.8 g, 0.138 mol) were combined with 125 mL of tetrahydrofuran and the solution was cooled to 3° C. in an ice-bath under nitrogen. 2-Acetoxybenzoyl chloride (25.0 g, 0.126 mol) was added as a solid, portionwise, so as to keep the temperature below 10° C. An additional 150 mL of tetrahydrofuran was added. After addition of all the 2-acetoxybenzoyl chloride, the ice-bath was removed and after stirring for 2 hr the mixture was poured into 300 mL of water and then combined with an additional 300 mL of water. The solid was collected and washed with water and dried. This afforded 33.6 g (86% yield) of product; m.p. 169°–171° C.

Anal Calcd for: $C_{17}H_{14}N_2O_4$: C, 65.80; H, 4.55; N, 9.03. Found: C, 65.47; H, 4.61; N, 8.93.

Intermediate B: 5-(2-Hydroxybenzamido)-2-methylbenzoxazole: 5-(2-Acetoxybenzamido)-2-methylbenzoxazole (10.0 g, 0.032 mol) was combined with sodium acetate (3.5 g, 0.043 mol) in 100 mL of MeOH and the solution was heated to reflux for 2.5 hr. The heat source was removed and after standing for 2 hours the mixture was chilled in a refrigerator overnight. The solid was collected and dried affording 7.2 g (84% yield) of product; m.p. 202°-206° C.

Anal Calcd for: $C_{15}H_{12}N_2O_3$: C, 67.16; H, 4.51; N, 10.44. Found: C, 66.68; H, 4.60; N, 10.44.

Intermediate C: Anhydro-5-(2-hydroxybenzamido)-2-methyl-3-(3-sulfobutyl)benzoxazolium hydroxide: 5-(2-Hydroxybenzamido)-2-methylbenzoxazole (5.5 g, 0.021 mol) was combined with 2,4-butanesultone (10 mL) and heated at 130° C. for 2 hours and then 5 mL of butyronitrile was added and the mixture was heated overnight at 120° C. The solid formed was collected and washed with acetone and dried (8.3 g, 100% yield).

Anal Calcd for: $C_{19}H_{20}N_2O_6S \cdot 2H_2O$: C, 53.97; H, 5.21; N, 6.63. Found: C, 53.73; H, 5.07; N, 6.44.

Preparation of Anhydro-5-chloro-9-ethyl-5'-(2-hydroxybenzamido)-3'-(3-sulfobutyl)-3-(3-sulfopropyl-)oxacarbocyanine Triethylammonium salt: Anhydro-5-(2-hydroxybenzamido)-2-methyl-3-(3-sulfobutyl)benzoxazolium hydroxide (10.0 g, 0.025 mol) was combined with anhydro-5-chloro-2-(2-ethoxybutenyl)-3-(3-sulfopropyl)benzoxazolium hydroxide (10.6 g, 0.028 mol) and 25 mL of m-cresol and heated to 85° C. Triethylamine (12 mL) was added and the mixture was heated at 100°-104° C. for 25 min. with stirring. The mixture was removed from the heat and diluted with ether. The orange oil that formed was crystallized from 500 mL of ethanol and 1 L of methanol, affording 6.7 g (32% Yield) of dye; λ-max=501 nm (MeOH), e-Max=14.4×$10^4$.

Anal Calcd for: $C_{39}H_{49}ClN_4O_{10}S_2 \cdot 1.5 H_2O$: C, 54.39; H, 6.04; N, 6.51. Found: C, 54.07; H, 5.91; N, 6.33.

Dye Evaluation

The photographic properties of dyes and photographic elements of the present invention were determined in a black and white film prepared by coating a polyester support with a silver halide emulsion layer containing chemically-sensitized 0.2 μm cubic silver bromoiodide (2.6 mol % I) at 10.8 mg Ag/dm², hardened gelatin at 73 mg/dm², and sensitizing dye at 0.8 mmole/mole Ag. The elements were given a wedge spectral exposure and processed in a developer containing hydroquinone and p-methylaminophenol as developing agents.

The photographic speed of the dyes is reported in terms of a sensitizing ratio (SR), which is defined as the speed at λ-max (in log E units multiplied by 100) minus the intrinsic speed of the dyed emulsion at 400 nm (in log E units multiplied by 100) plus 200. This measurement of speed allows for comparison while using a uniform chemical sensitization that is not optimized for each sensitizing dye. The λ-max was determined from absorptance measurements.

Black and white stain was measured by placing the processed film in front of a scanning spectrophotometer. The total transmission was measured between 400 and 900 nm. This data was plotted as absorbance (-log 1/T). The stain was then calculated as the maximum absorbance at any wavelength in the range (Table I).

Dye stain was determined in a color format prepared by coating a polyester support with a silver halide emulsion layer containing chemically-sensitized 0.8 μm cubic silver bromoiodide (3.6 mole % I) at 16 mg Ag/dm², hardened gelatin at 63 mg/dm², tetrazaindine antifoggant at 5 mg/dm², a coupler (shown below) at 14 mg/dm² and sensitizing dye at 0.4 mmole/mole Ag. Color stain was obtained by processing unexposed color coatings for 3.5 minutes at 33° C. in the processing solution described below, followed by 1.5 minutes in a bleach-fix solution, and then a 3.5 minute wash. Stain was measured by placing the processed film in front of a scanning spectrophotometer. The stain was calculated as the maximum absorbance at any wavelength in the range 400-900 nm (Table I). In some cases, where more than one absorption peak was observed, the stain was calculated as the maximum absorbances at the wavelengths of the respective peaks.

| Processing Solution | |
|---|---|
| benzyl alcohol | 14.2 mL |
| potassium carbonate | 28 g |
| 45% potassium sulfite | 2.75 mL |
| triethanolamine | 11 mL |
| hydroxylamine sulfate | 3.2 g |
| potassium bromide | 0.58 g |
| potassium chloride | 0.13 g |
| lithium chloride | 0.13 g |
| anticalcium agent | 0.8 Ml |
| water to make | 1.0 L |
| pH adjusted to | 10.08 |

Dye stain is listed in Table 1 as Optical Density ("OD")×$10^3$.

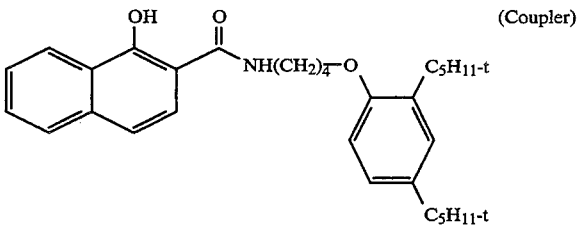
(Coupler)

The results are shown in Table 1 below. Dyes C-1 and C-2 are comparison dyes.

TABLE 1

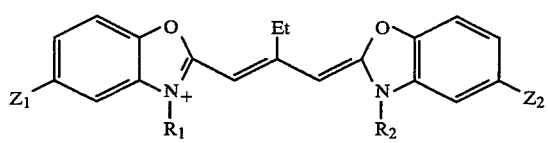

| $Z_1$ | $Z_2$ | $R_1, R_2$ | B&W SR (λmax) | B&W Stain (λmax) | Color Stain (λmax) |
| --- | --- | --- | --- | --- | --- |

TABLE 1-continued
| | | | | | | | |
|---|---|---|---|---|---|---|---|
| C-1 | 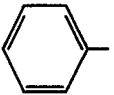 | Cl | 3SB, SP | 250 (547) | 48 (508) | 43 (510) | |
| C-2 | 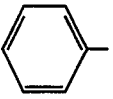 | F | SP, SP | 235 (538) | 48 (506) | 25 (508) | |
| I-9 | 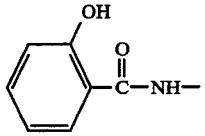 | Cl | 3SB, SP | 247 (541) | 42 (540) | 9 (510) | |
| I-10 | 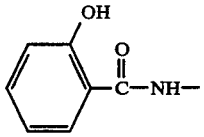 | F | 3SB, SP | 241 (542) | 39 (508) | 4 (510) | |
| I-16 | 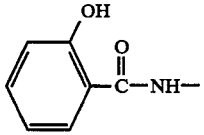 | Cl | 3SB, SP | 247 541 | 32, 42 (508 540J) | 9 (510) | |
| I-17 | " | Cl | Et, SP | 242 542 | 40 (515) | 52 (512) | |
| I-17a | " | Cl | SE, SP | 246 550 | 54 (510) | | |
| I-17b | " | Cl | SE, SE | | | | |
| I-18 | " | F | 3SB, SP | 243 542 | 39 (508) | 4 (510) | |
| I-18a | " | =Z₁ | 3SB, 3SB | 244 539 | >100 (540J) | 17, 40 (510 543) | |
| I-19 | " | =Z₁ | SE, SE | 244 539 | >100 (540J) | 16, 35 (510 545) | |
| I-19a | 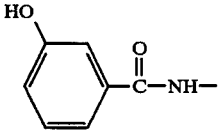 | Cl | SP, SP | 254 544 | 44.5 (508) | 15.9 (508) | |
| I-20 | 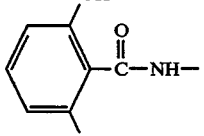 | Cl | 4SB, SP | 237 541 | 27, 30 (490H 510) | 19 (510) | |
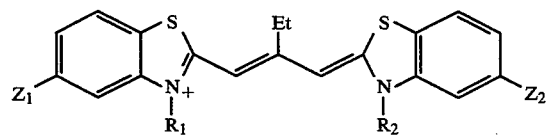
| Dye | Z₁ | Z₂ | R₁, R₂ | B&W SR (λmax) | Color Stain (λmax) |
|---|---|---|---|---|---|
| I-21 | 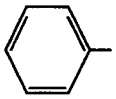 | =Z₁ | SP, SP | 192 (630) | 65 (585) |

TABLE 1-continued

| I-22 | OH (structure with C(=O)-NH-) | =Z₁ | | SP, SP | 177 (594) | | 19 (580) |

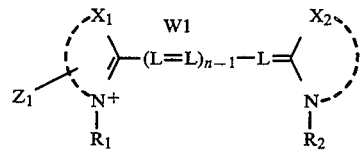

| Dye | $X_1, X_2$ | $Z_1$ | $Z_2$ | $R_1, R_2$ | B&W SR ($\lambda$max) | B&W Stain ($\lambda$max) | Color Stain ($\lambda$max) |
|---|---|---|---|---|---|---|---|
| I-23 | S, S | (phenyl) | Cl | SP, SP | 240 (470) | precipitate | 72 (465) |
| I-24 | S, S | (2-hydroxybenzamido) | Cl | SP, SP | 224 (465) | 49 (465) | 40 (465) |

SP = 3-sulfopropyl;
SE = 2-sulfoethyl;
SB = 3-sulfobutyl
Et = ethyl
All $\lambda$ in nm
"H" and "J" indicate aggregate formation
two values for a $\lambda$max indicates two peaks, and the corresponding stain figures are shown for both peaks As can be seen from Table I, the dyes of the present invention, provide effective sensitization, while producing only low post-process stain. It is believed that the relatively low dye stain with the presence of an α-hydroxyarylacyl group results from the foregoing group acting as a "pH-switch". That is, at high pH in the developer the activated phenol can deprotonate which gives the dye an additional negative charge and can therefore desorb the dye from the silver halide grain to facilitate wash-out from the photographic element. Evidence for such a pH-switch effect is provided in FIG. 1. FIG. 1 shows optical density curves of I-1 adsorbed to an unexposed thin tabular grain silver bromoiodide emulsion. Treatment of a coating with pH 12.8 buffer for 7 minutes results in a significant decrease in dye density, as can be seen from FIG. 1. By comparison, FIG. 2 indicates that the same treatment given to comparison dye C-3 (structure below) which does not have a 5-(2-hydroxybenzamido) substituent, does not result in dye removal under these conditions.

C-3

The invention has been described in detail with particular reference to preferred embodiments, but it will be understood that variations and modifications can be effected within the spirit and scope of the invention.

What is claimed is:

1. A silver halide photographic element comprising a silver halide emulsion sensitized with a sensitizing dye of the formula:

$$\underset{R_1}{\underset{|}{Z_1 \diagdown \underset{N^+}{\overset{X_1}{\diagup}}}} \!\!=\!\! (L\!=\!L)_{n-1}\!-\!L\!=\!\!\underset{R_2}{\underset{|}{\diagup \underset{N}{\overset{X_2}{\diagdown}} \diagdown}}$$

wherein:

$X_1$ and $X_2$ independently represent the atoms necessary to complete a benzothiazole nucleus, benzoxazole nucleus, benzoselenazole nucleus, benzotellurazole nucleus, quinoline nucleus, or benzimidazole nucleus in which $X_1$ may be further substituted and $X_2$ may be substituted or unsubstituted;

n is a positive integer from 1 to 4, each L independently represents a substituted or unsubstituted methine group, $R_1$ and $R_2$ each independently represents substituted or unsubstituted aryl or substituted or unsubstituted aliphatic group;

$Z_1$ represents a substituent which contains an α-hydroxyarylacyl group of formula HO—Ar—CO— in which Ar is an aromatic ring, where Ar may optionally be appended or fused to $X_1$; and W1 is a counterion as needed to balance the charge of the molecule.

2. A silver halide photographic element according to claim 1 wherein the α-hydroxyarylacyl group of $Z_1$ is selected from an α-hydroxyarylketone, an α-hydroxyarylcarboxylic acid, an α-hydroxyarylester, an α-hydroxyarylaldehyde and an α-hydroxyarylamide.

3. A silver halide photographic element according to claim 1 wherein any further substituent on $X_1$ and any substituent on $X_2$ are non-aromatic.

4. A silver halide photographic element according to claim 3 wherein the aromatic ring of the α-hydroxyarylacyl group is appended directly to $X_1$.

5. A silver halide photographic element according to claim 3 wherein $Z_1$ comprises an α-hydroxyarylamide the nitrogen of which is appended directly to $X_1$.

6. A silver halide photographic element according to claim 1 wherein the sensitizing dye is of the formula:

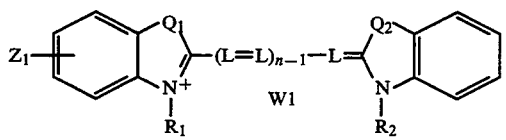

wherein:

$Q_1$ and $Q_2$ independently represent O, N, or S;

n is a positive integer from 1 to 4;

each L independently represents a substituted or unsubstituted methine group;

$R_1$ and $R_2$ each independently represents a substituted or unsubstituted aryl or substituted or unsubstituted aliphatic group;

$Z_1$ represents a substituent which contains an α-hydroxyarylacyl group of formula HO—Ar—CO— in which Ar is an aromatic ring, where Ar may optionally be appended or fused to the benzene ring shown;

the benzene rings are optionally further substituted with non-aromatic substituents;

W1 is a counterion as needed to balance the charge of the molecule.

7. A silver halide photographic element according to claim 6 wherein $Z_1$ contains a group selected from an α-hydroxyarylketone, an α-hydroxyarylcarboxylic acid, an α-hydroxyarylester, an α-hydroxyarylaldehyde and an α-hydroxyarylamide.

8. A silver halide photographic element according to claim 6 wherein the aromatic ring of the α-hydroxyphenylacyl group is appended directly to the benzene ring shown.

9. A silver halide photographic element according to claim 6 wherein $Z_1$ comprises an α-hydroxyphenylamide the N of which is appended to the benzene ring shown.

10. A silver halide photographic element according to claim 1 wherein the sensitizing dye is of the formula:

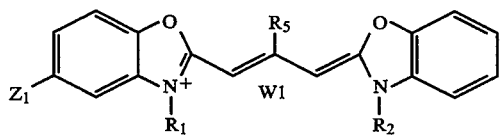

wherein $R_5$ is a substituted or unsubstituted lower alkyl and each of the benzene rings of each benzoxazole nucleus may be optionally further substituted with a non-aromatic substituent.

11. A silver halide photographic element according to claim 10 wherein the element is a color element having a blue sensitive layer, a green sensitive layer and a red sensitive layer.

12. A silver halide photographic element according to claim 10 additionally comprising a dispersion of a water-immiscible solvent into which the sensitizing dye can migrate.

13. A silver halide photographic element according to claim 10 additionally comprising a dispersion of a water-immiscible solvent carrying a color coupler.

14. A silver halide photographic element according to claim 13 wherein the element is a color element having a blue sensitive layer, a green sensitive layer and a red sensitive layer.

15. A silver halide photographic element according to claim 10 wherein $Z_1$ contains a group selected from an α-hydroxyarylketone, an α-hydroxyarylcarboxylic acid, an α-hydroxyarylester, an α-hydroxyarylaldehyde and an α-hydroxyarylamide.

16. A silver halide photographic element according to claim 15 wherein the element is a color element having a blue sensitive layer, a green sensitive layer and a red sensitive layer.

17. A silver halide photographic element according to claim 10 wherein the aromatic ring of the α-hydroxyphenylacyl group is appended directly to the benzene ring shown.

18. A silver halide photographic element according to claim 17 wherein the element is a color element having a blue sensitive layer, a green sensitive layer and a red sensitive layer.

19. A silver halide photographic element according to claim 10 wherein $Z_1$ comprises an α-hydroxyphenylamide.

20. A silver halide photographic element according to claim 19 wherein the element is a color element having a blue sensitive layer, a green sensitive layer and a red sensitive layer.

21. A silver halide photographic element according to claim 19 wherein the N of the hydroxyphenylamide is appended to the phenyl group of the dye nucleus.

22. A silver halide photographic element according to claim 21 wherein the element is a color element having a blue sensitive layer, a green sensitive layer and a red sensitive layer.

23. A silver halide photographic element according to claim 10 wherein the silver halide emulsion sensitized with the dye is a tabular grain silver halide emulsion wherein at least 50% of the grain population is accounted for by tabular grains that have a thickness of less than 0.5 μm and which satisfy the formula $ECD/t^2 > 25$, wherein ECD represents the average equivalent circular diameter of the tabular grains in micrometers, and t represents the average thickness of the grains in micrometers.

24. A photographic element according to claim 10, wherein the silver halide emulsion sensitized with the dye comprises at least 95 mole percent silver chloride.

25. A silver halide photographic element according to claim 24 wherein the element is a color element having a blue sensitive layer, a green sensitive layer and a red sensitive layer.

26. A silver halide photographic element according to claim 1 wherein the element is a color element having a blue sensitive layer, a green sensitive layer and a red sensitive layer.

* * * * *